(12) United States Patent
Ouyang

(10) Patent No.: US 12,541,512 B1
(45) Date of Patent: Feb. 3, 2026

(54) PROVIDING CACHED DATABASE VIEWS THAT INCLUDE DYNAMIC CONDITIONS

(71) Applicant: SAP SE, Walldorf (DE)

(72) Inventor: Yinghua Ouyang, Xi'an (CN)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 18/966,625

(22) Filed: Dec. 3, 2024

(51) Int. Cl.
*G06F 16/2453* (2019.01)

(52) U.S. Cl.
CPC .. *G06F 16/24539* (2019.01); *G06F 16/24542* (2019.01)

(58) Field of Classification Search
CPC ............. G06F 16/24539; G06F 16/24542
See application file for complete search history.

(56) References Cited

U.S. PATENT DOCUMENTS

| | | | |
|---|---|---|---|
| 10,545,984 B2 | 1/2020 | Zhang et al. | |
| 11,061,927 B2 | 7/2021 | Ouyang et al. | |
| 11,321,330 B1 * | 5/2022 | Pandis | G06F 16/2471 |
| 11,429,610 B2 | 8/2022 | Cheng et al. | |
| 11,775,521 B2 | 10/2023 | Ouyang et al. | |
| 11,972,012 B2 | 4/2024 | Ouyang et al. | |
| 12,045,155 B1 | 7/2024 | Ouyang et al. | |
| 12,386,835 B1 * | 8/2025 | Zhang | G06F 16/24526 |
| 12,405,953 B1 * | 9/2025 | Zhang | G06F 16/24542 |
| 2005/0182756 A1 | 8/2005 | Eppley et al. | |
| 2006/0218129 A1 | 9/2006 | Muras | |
| 2018/0107832 A1 | 4/2018 | Ouyang et al. | |
| 2020/0301901 A1 | 9/2020 | Hao et al. | |
| 2021/0303576 A1 | 9/2021 | Ouyang et al. | |
| 2023/0048391 A1 * | 2/2023 | Jeong | G06F 16/24542 |
| 2023/0229658 A1 * | 7/2023 | Newman | G06F 16/24539 707/713 |
| 2023/0325386 A1 | 10/2023 | Cruanes et al. | |
| 2023/0376485 A1 | 11/2023 | Qu et al. | |
| 2024/0086404 A1 | 3/2024 | Lee et al. | |
| 2024/0152513 A1 | 5/2024 | Ouyang et al. | |
| 2024/0160627 A1 | 5/2024 | Ouyang | |
| 2025/0077902 A1 | 3/2025 | Wittekind | |

OTHER PUBLICATIONS

U.S. Appl. No. 18/180,221, filed Mar. 8, 2023, Zhang et al.
U.S. Appl. No. 18/496,416, filed Oct. 27, 2023, Ouyang.
U.S. Appl. No. 18/496,449, filed Oct. 27, 2023, Ouyang.
U.S. Appl. No. 18/821,049, filed Aug. 30, 2024, Zhang et al.
U.S. Appl. No. 18/821,078, filed Aug. 30, 2024, Zhang et al.

* cited by examiner

*Primary Examiner* — Dangelino N Gortayo
(74) *Attorney, Agent, or Firm* — Fish & Richardson P.C.

(57) ABSTRACT

The present disclosure involves systems, software, and computer implemented methods for providing cached database views with dynamic conditions. One example method includes traversing a query optimizer tree for a query to identify view nodes that have dynamic conditions. For each view node, a condition provider procedure is invoked to generate a filter string which is converted to a query optimizer predicate that is injected into the view node. The query optimizer tree is traversed to identify view nodes that are result cache enabled and to determine a best matching result cache candidate. The view node is replaced with the best matching result cache candidate. A result cache is generated based on data from the view nodes of the query optimizer tree. Data from the result cache is filtered by applying query optimizer predicates and a query result is generated based on data from the filtered result cache.

20 Claims, 6 Drawing Sheets

```
302 ┌─ create schema "TEST_SCHEMA";
   │  create column table "TEST_SCHEMA"."T1" ("year_key" nvarchar(10), "year_sid"
   │     nvarchar(10), "customer_sid" nvarchar(10), "sales" int);
   │  insert into "TEST_SCHEMA"."T1" values ('2006', '2006', 'CUSTOMER_A', 1000);
   │  insert into "TEST_SCHEMA"."T1" values ('2006', '2006', 'CUSTOMER_B', 3000);
   │  insert into "TEST_SCHEMA"."T1" values ('2007', '2007', 'CUSTOMER_A', 1000);
   └─ insert into "TEST_SCHEMA"."T1" values ('2007', '2007', 'CUSTOMER_B', 2000);

304 ┌─ CREATE VIEW "TEST_SCHEMA"."V1" AS (SELECT * FROM "TEST_SCHEMA"."T1") WITH STRUCTURED
   └─    FILTER CHECK;

306 ─── --cache the result of view "V1"
       ALTER VIEW "TEST_SCHEMA"."V1" ADD CACHE RETENTION 120;

308 ┌─ --create dynamic conditions
   │  CREATE COLUMN TABLE "TEST_SCHEMA"."PT" ("filter_string" varchar(5000), "userName"
   │     varchar(256));
   │  INSERT INTO "TEST_SCHEMA"."PT" VALUES('"year_key" = ''2006''', 'SYSTEM');
   │  CREATE PROCEDURE "TEST_SCHEMA"."P1" (OUT VAL VARCHAR(5000))
   │     LANGUAGE SQLSCRIPT SQL SECURITY DEFINER READS SQL DATA AS
   │  BEGIN
   │     DECLARE v_Val VARCHAR(5000);
   │     DECLARE CURSOR c_GetOneOperand FOR
   │        SELECT "filter_string" FROM "TEST_SCHEMA"."PT" WHERE
   │           "userName" = SESSION_USER;
   │     OPEN c_GetOneOperand;
   │     FETCH c_GetOneOperand INTO v_Val;
   │     IF c_GetOneOperand::NOTFOUND THEN
   │        VAL = NULL;
   │     ELSE
   │        VAL = v_Val;
   │     END IF;
   │     CLOSE c_GetOneOperand;
   │  END;
   │
   │  CREATE STRUCTURED FILTER "TEST_SCHEMA"."SF1" FOR SELECT ON "TEST_SCHEMA"."V1"
   └─    CONDITION PROVIDER "TEST_SCHEMA"."P1";

310 ┌─ --Result cache of view "V1" is built before dynamic condition "year_key" = '2006' is
   │     applied during below query execution
   │  SELECT "year_key", "year_sid", "sales" FROM "TEST_SCHEMA"."V1" GROUP BY "year_key",
   └─    "year_sid", "sales" WITH HINT(RESULT_CACHE_BEFORE_STRUCTURED_FILTER, RESULT_CACHE);
```

PROVIDING CACHED DATABASE VIEWS THAT INCLUDE DYNAMIC CONDITIONS

TECHNICAL FIELD

The present disclosure relates to computer-implemented methods, software, and systems for providing cached database views that include dynamic conditions.

BACKGROUND

A database query plan includes a sequence of steps for executing a query. Different query plans can be created for a same query. The different query plans can be evaluated and a query plan that is predicted to achieve a best performance can be selected for execution of the query.

SUMMARY

The present disclosure involves systems, software, and computer implemented methods for providing cached database views that include dynamic conditions. An example method includes: traversing, for a query received at a database system, a query optimizer tree for the query to identify first view nodes that have dynamic conditions; for each first view node of the first view nodes: invoking a condition provider procedure of the database system to generate a filter string from a permission table for a current user associated with the query; converting the filter string to a dynamic-filter-based query optimizer predicate; and injecting the dynamic-filter-based query optimizer predicate into the first view node in the query optimizer tree; traversing the query optimizer tree to identify second view nodes that are result cache enabled; for each second view node of the second view nodes: identifying result cache candidates for the second view node; determining a best matching result cache candidate from among the result cache candidates; and replacing, in the query optimizer tree, the second view node with the best matching result cache candidate; executing the query, comprising: generating a query execution plan; building a result cache based on data from the second view nodes of the query optimizer tree; generating a filtered result cache by filtering data from the result cache by applying respective dynamic-filter-based query optimizer predicates; and generating a query result set based at least in part on data from the filtered result cache; and providing the query result set in response to the query.

Implementations may include one or more of the following features. The query optimizer tree can be generated base on a query compiler tree. The query compiler tree can be generated based on a global query parse tree. The global query parse tree can be generated based on parsing the query received at the database system. The query can be a structured query language (SQL) query. Filtering the data from the result cache can include applying a first dynamic-filter-based query optimizer predicate for the current user to filter out data not appropriate for the current user. An initial configuration of the database system might not support cached views with dynamic conditions. Multiple result cache candidates for at least one second view node can be identified. The best matching result cache candidate for at least one second view node can be determined based on determining a best match of result cache candidates to the query received at the database system.

While generally described as computer-implemented software embodied on tangible media that processes and transforms the respective data, some or all of the aspects may be computer-implemented methods or further included in respective systems or other devices for performing this described functionality. The details of these and other aspects and embodiments of the present disclosure are set forth in the accompanying drawings and the description below. Other features, objects, and advantages of the disclosure will be apparent from the description and drawings, and from the claims.

DESCRIPTION OF DRAWINGS

FIG. 3 illustrates example code related to querying a view with a dynamic condition.

DETAILED DESCRIPTION

A database system can support database views. A view can provide a virtual table for users that can be generated based on a query (e.g., SQL query) that is executed before the view is accessed. Query execution for view queries can result in a substantial performance burden on the database, especially for views that have a complex query.

A database system can utilize cached views (e.g., in a result cache) to lessen a performance burden of executing view queries. For example, the database system can use the result cache to reduce processor utilization, increase overall system throughput, and reduce a general response time of queries by caching, in the result cache, a result of evaluating a view and then reusing the cached data when the view is accessed by a user query (e.g., a query that queries the view itself).

A database system can also support dynamic plan conditions. Dynamic plan conditions can be used, for example, for row-level access control on database objects. For instance, sales data for all sales regions of an organization may be accessed by querying one view. However, application requirements may specify that regional sales managers, for example, should only see sales data for their region. In this example, dynamic conditions can be used to generate different filter strings for different users to access different portions of sales data in a same view.

However, some database systems, by default, do not support cached views that have dynamic conditions. Accordingly, in these default database implementations, the database system cannot leverage cached views that have a query involving dynamic conditions. Accordingly, the database system cannot reduce query compilation and execution time for these views, which can have a substantial impact on query performance.

An improved caching approach can be utilized to add support to a database system for cached views with dynamic conditions. The improved caching approach can involve, during query compilation, converting dynamic conditions into query optimizer predicates, injecting the query predicates into view nodes, finding a best matching result cache candidate for each view node, and replacing the view node with the best matching result cache candidate in a query plan. During query execution for a cached view with dynamic conditions, the result cache can be built before the authorization restrictions are applied. For example, data can be read from the cached view and the dynamic condition can be applied when the data is queried so that only qualified data is selected for each user.

Figure 1:
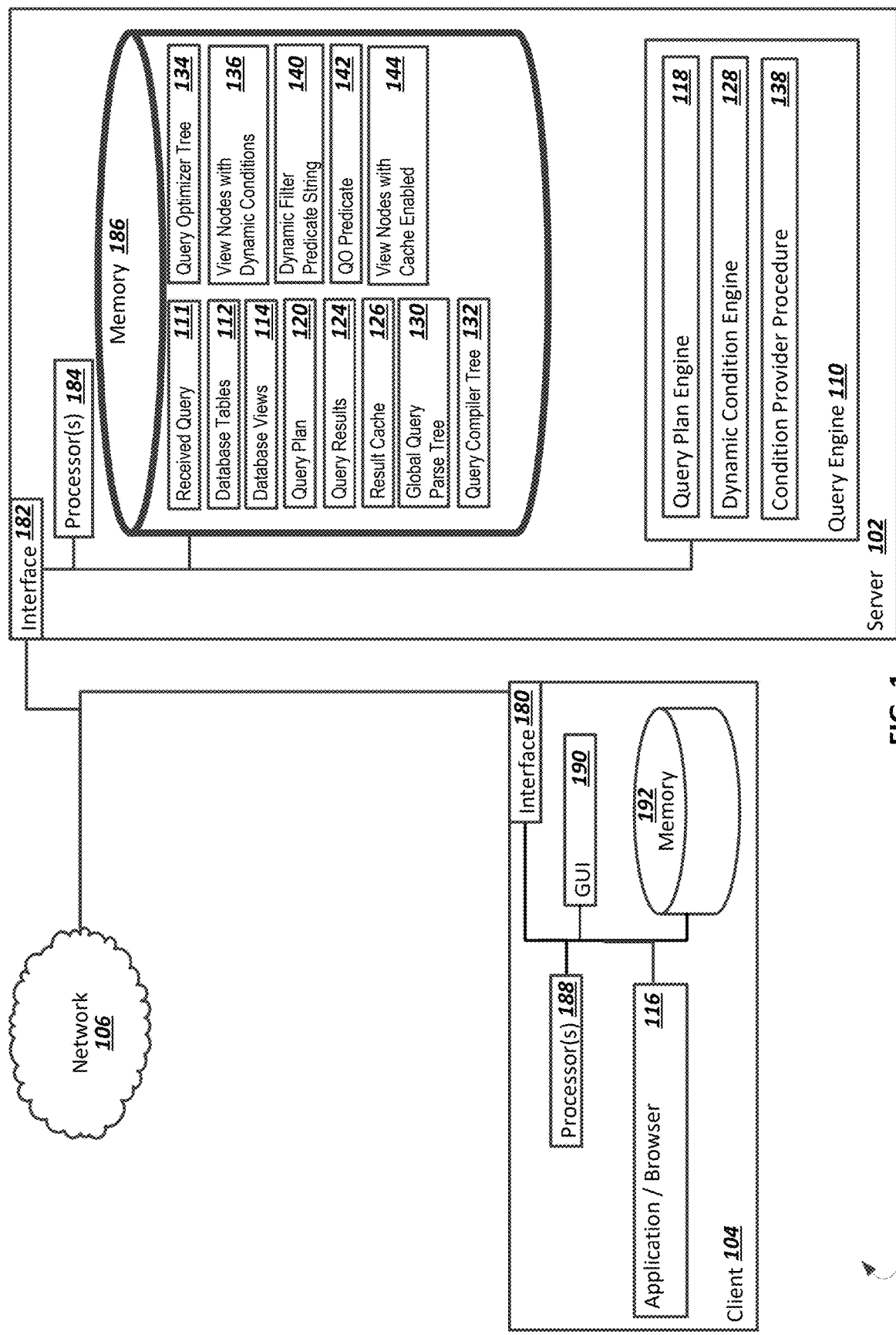
FIG. 1 is a block diagram illustrating an example system for providing cached database views that include dynamic conditions.

FIG. 1 is a block diagram illustrating an example system 100 for providing cached database views that include dynamic conditions. Specifically, the illustrated system 100 includes or is communicably coupled with a server 102, a client device 104, and a network 106. Although shown separately, in some implementations, functionality of two or more systems or servers may be provided by a single system or server. In some implementations, the functionality of one illustrated system, server, or component may be provided by multiple systems, servers, or components, respectively.

The server 102 (which may be a database server) includes a query engine 110. The query engine 110 can process a received query 111 against database artifacts such as database tables 112, database views 114, etc. The query engine 110 can process queries based on requests received from an application/browser 116, from internal server processes, or other types of requests. A query plan engine 118 of the query engine 110 can generate a query plan 120 based on the received query 111. The query engine 110 can execute the query plan 120 to generate query results 124. The query results 124 can be provided to a requestor who provided the received query 111.

When the received query 111 queries a database view 114, the query engine 110 can use a result cache 126 to improve performance rather than regenerate the database view 114 for each received query 111 that queries the database view 114. As mentioned, however, database views 114 can be based on queries that have dynamic plan conditions. Dynamic plan conditions can be used for row level access control on the database views 114. For example, while sales data for all regions may be included within one database view 114, the database can be configured so that regional sales managers only see the data for their region. Dynamic plan conditions can generate different filter strings for different users to access different portions of data in the same view. However, the database, as initially configured, may not support caching of database views 114 that are based on dynamic conditions.

A dynamic condition engine 128 of the query engine 110 can coordinate adding support to the database system for caching views that are based on dynamic conditions. For example, upon receiving the received query 111 (e.g., where the received query 111 queries a database view 114 with dynamic conditions), the query engine 110 can parse, check, and preprocess the received query 111 to generate a global query parse tree 130. The query engine 110 can convert the global query parse tree 130 to a query compiler (QC) tree 132 and then convert the query compiler tree 132 to a query optimizer (QO) tree 134.

The dynamic condition engine 128 can traverse the query optimizer tree 134 to collect view nodes 136 that have dynamic conditions. The dynamic condition engine 128 can then perform processing on each collected view node in the collected view nodes 136. For instance, the dynamic condition engine 128 can invoke a condition provider procedure 138 to generate a dynamic filter predicate string 140 from a permission table (e.g., where the permission table can be included in the database tables 112 (e.g., as a system table)). The dynamic condition engine 128 can convert the dynamic filter predicate string 140 to a QO predicate 142 and then inject the QO predicate 142 into the particular view node being processed of the collected view nodes 136.

After all the collected view nodes 136 have been initially processed, the dynamic condition engine 128 can traverse the query optimizer tree 134 again to collect view nodes 144 with result cache enabled. The dynamic condition engine 128 can then perform processing on each collected view node in the collected view nodes 144. The dynamic condition engine 128 can collect result cache candidates for the view node from the result cache 126 and can then determine a best matching result cache candidate. Multiple result cache candidates can exist for a same view, for example, and some result cache candidates may have a filter. A best matching result cache candidate can be a result cache candidate that best matches a filter of the user query (or that has no filter, if the user query has no filter). The dynamic condition engine 128 can replace, in the query optimizer tree 134, the view node being processed with the identified best matching result cache candidate.

The query engine 110 can continue to optimize the query optimizer tree 134 as generally done for queries. The query plan engine 118 can generate the query plan 120 based on the query optimizer tree 134. During query execution, the query engine 110 can execute the received query 111 based on the query plan 120, which can involve reading data from cached view nodes in the query optimizer tree 134. The query engine 110 can filter the data read from the cached view nodes by applying the dynamic filter predicate string 140 before including data in the query results 124.

As used in the present disclosure, the term "computer" is intended to encompass any suitable processing device. For example, although FIG. 1 illustrates a single server 102, and a single client device 104, the system 100 can be implemented using a single, stand-alone computing device, two or more servers 102, or two or more client devices 104. Indeed, the server 102 and the client device 104 may be any computer or processing device such as, for example, a blade server, general-purpose personal computer (PC), Mac®, workstation, UNIX-based workstation, or any other suitable device. In other words, the present disclosure contemplates computers other than general purpose computers, as well as computers without conventional operating systems. Further, the server 102 and the client device 104 may be adapted to execute any operating system, including Linux, UNIX, Windows, Mac OS®, Java™, Android™, iOS or any other suitable operating system. According to one implementation, the server 102 may also include or be communicably coupled with an e-mail server, a Web server, a caching server, a streaming data server, and/or other suitable server.

Interfaces 180 and 182 are used by the client device 104 and the server 102, respectively, for communicating with other systems in a distributed environment—including within the system 100—connected to the network 106. Generally, the interfaces 180 and 182 each comprise logic encoded in software and/or hardware in a suitable combination and operable to communicate with the network 106. More specifically, the interfaces 180 and 182 may each comprise software supporting one or more communication protocols associated with communications such that the network 106 or interface's hardware is operable to communicate physical signals within and outside of the illustrated system 100.

The server 102 includes one or more processors 184. Each processor 184 may be a central processing unit (CPU), a blade, an application specific integrated circuit (ASIC), a field-programmable gate array (FPGA), or another suitable component. Generally, each processor 184 executes instructions and manipulates data to perform the operations of the server 102. Specifically, each processor 184 executes the functionality required to receive and respond to requests from the client device 104, for example.

Regardless of the particular implementation, "software" may include computer-readable instructions, firmware, wired and/or programmed hardware, or any combination thereof on a tangible medium (transitory or non-transitory, as appropriate) operable when executed to perform at least the processes and operations described herein. Indeed, each software component may be fully or partially written or described in any appropriate computer language including C, C++, Java™, JavaScript®, Visual Basic, assembler, Perl®, any suitable version of 4GL, as well as others. While portions of the software illustrated in FIG. 1 are shown as individual modules that implement the various features and functionality through various objects, methods, or other processes, the software may instead include a number of sub-modules, third-party services, components, libraries, and such, as appropriate. Conversely, the features and functionality of various components can be combined into single components as appropriate.

The server 102 includes memory 186. In some implementations, the server 102 includes multiple memories. The memory 186 may include any type of memory or database module and may take the form of volatile and/or non-volatile memory including, without limitation, magnetic media, optical media, random access memory (RAM), read-only memory (ROM), removable media, or any other suitable local or remote memory component. The memory 186 may store various objects or data, including caches, classes, frameworks, applications, backup data, business objects, jobs, web pages, web page templates, database tables, database queries, repositories storing business and/or dynamic information, and any other appropriate information including any parameters, variables, algorithms, instructions, rules, constraints, or references thereto associated with the purposes of the server 102.

The client device 104 may generally be any computing device operable to connect to or communicate with the server 102 via the network 106 using a wireline or wireless connection. In general, the client device 104 comprises an electronic computer device operable to receive, transmit, process, and store any appropriate data associated with the system 100 of FIG. 1. The client device 104 can include one or more client applications, including the application/browser 116. A client application is any type of application that allows the client device 104 to request and view content on the client device 104. In some implementations, a client application can use parameters, metadata, and other information received at launch to access a particular set of data from the server 102. In some instances, a client application may be an agent or client-side version of the one or more enterprise applications running on an enterprise server (not shown).

The client device 104 further includes one or more processors 188. Each processor 188 included in the client device 104 may be a central processing unit (CPU), an application specific integrated circuit (ASIC), a field-programmable gate array (FPGA), or another suitable component. Generally, each processor 188 included in the client device 104 executes instructions and manipulates data to perform the operations of the client device 104. Specifically, each processor 188 included in the client device 104 executes the functionality required to send requests to the server 102 and to receive and process responses from the server 102.

The client device 104 is generally intended to encompass any client computing device such as a laptop/notebook computer, wireless data port, smart phone, personal data assistant (PDA), tablet computing device, one or more processors within these devices, or any other suitable processing device. For example, the client device 104 may comprise a computer that includes an input device, such as a keypad, touch screen, or other device that can accept user information, and an output device that conveys information associated with the operation of the server 102, or the client device 104 itself, including digital data, visual information, or a GUI 190.

The GUI 190 of the client device 104 interfaces with at least a portion of the system 100 for any suitable purpose, including generating a visual representation of the application/browser 116. In particular, the GUI 190 may be used to view and navigate various Web pages, or other user interfaces. Generally, the GUI 190 provides the user with an efficient and user-friendly presentation of business data provided by or communicated within the system. The GUI 190 may comprise a plurality of customizable frames or views having interactive fields, pull-down lists, and buttons operated by the user. The GUI 190 contemplates any suitable graphical user interface, such as a combination of a generic web browser, intelligent engine, and command line interface (CLI) that processes information and efficiently presents the results to the user visually.

Memory 192 included in the client device 104 may include any memory or database module and may take the form of volatile or non-volatile memory including, without limitation, magnetic media, optical media, random access memory (RAM), read-only memory (ROM), removable media, or any other suitable local or remote memory component. The memory 192 may store various objects or data, including user selections, caches, classes, frameworks, applications, backup data, business objects, jobs, web pages, web page templates, database tables, repositories storing business and/or dynamic information, and any other appropriate information including any parameters, variables, algorithms, instructions, rules, constraints, or references thereto associated with the purposes of the client device 104.

There may be any number of client devices 104 associated with, or external to, the system 100. For example, while the illustrated system 100 includes one client device 104, alternative implementations of the system 100 may include multiple client devices 104 communicably coupled to the server 102 and/or the network 106, or any other number suitable to the purposes of the system 100. Additionally, there may also be one or more additional client devices 104 external to the illustrated portion of system 100 that are capable of interacting with the system 100 via the network 106. Further, the term "client", "client device" and "user" may be used interchangeably as appropriate without departing from the scope of this disclosure. Moreover, while the client device 104 is described in terms of being used by a single user, this disclosure contemplates that many users may use one computer, or that one user may use multiple computers.

Figure 2A:
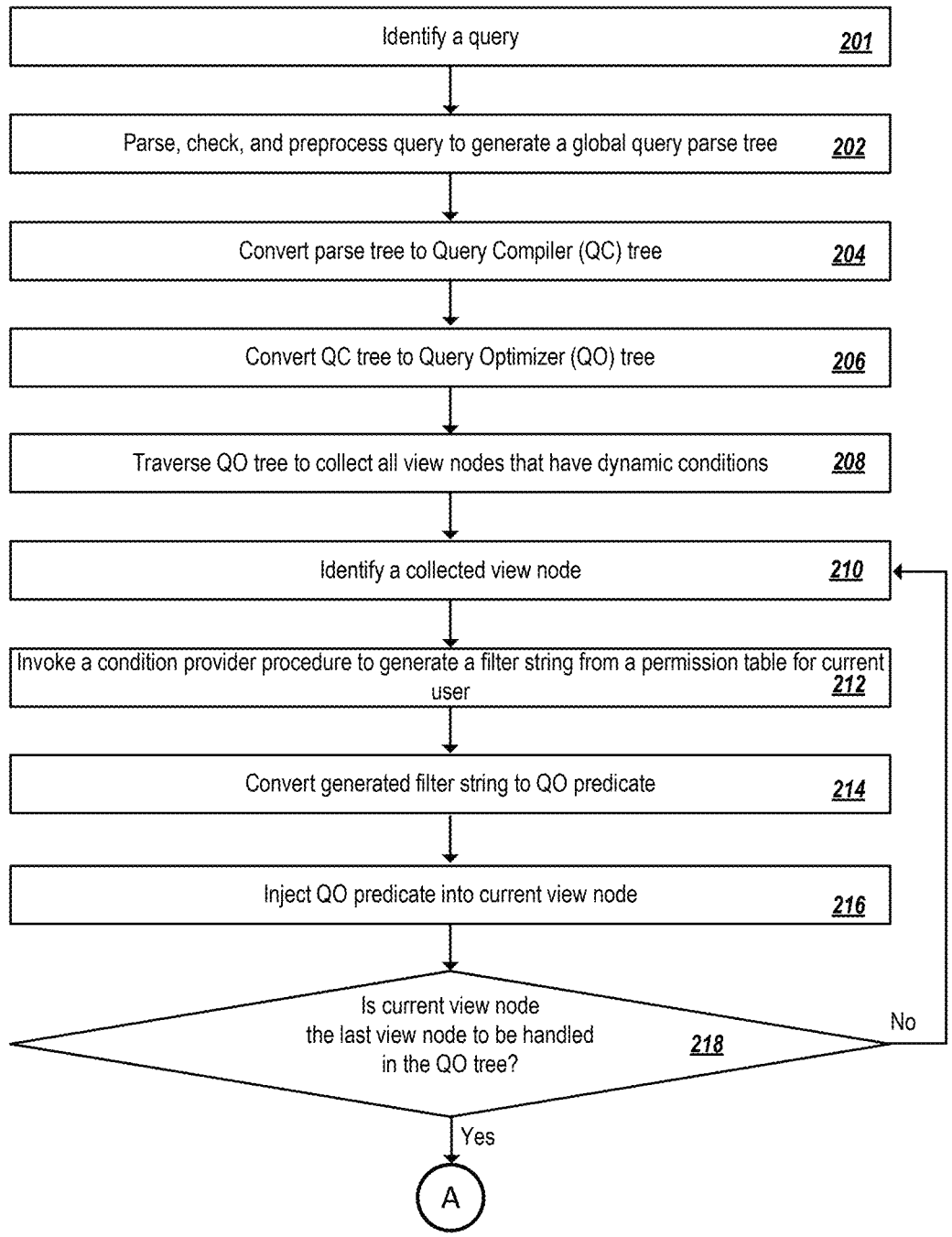
FIGS. 2A-2B are a flowchart of an example method for providing cached database views that include dynamic conditions.
Figure 2B:
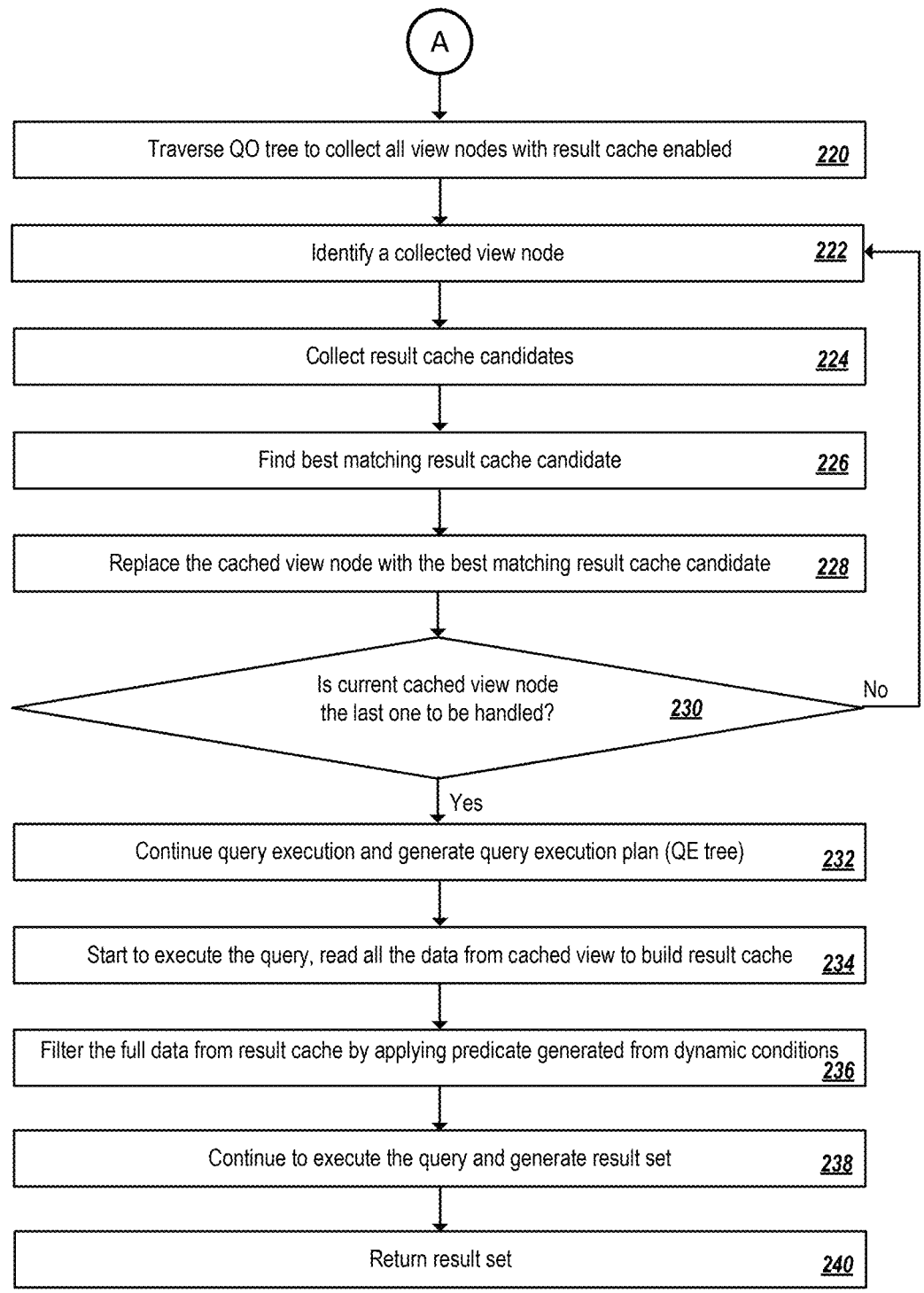

FIGS. 2A-2B are a flowchart of an example method 200 for providing cached database views that include dynamic conditions.

At 201, a query is identified.

At 202, the query is parsed, checked for correctness, and pre-processed resulting in generation of a global query parse tree for the query.

At 204, the global query parse tree is converted to a query compiler tree.

At 206, the query compiler tree is converted to a query optimizer tree.

At 208, the query optimizer tree is traversed to collect all view nodes that have at least one dynamic condition.

At 210, a first view node of the collected view nodes is identified as a current view node under processing.

At 212, a condition provider procedure is invoked to generate a filter string from a permission table for a current user associated with the query.

At 214, the generated filter string is converted to a query optimizer predicate.

At 216, the query optimizer predicate is injected into the first view node.

At 218, a determination is made as to whether the current view node is a last view node to be handled of the view nodes collected from the query optimizer tree.

If the current view node is not the last view node to be handled of the view nodes collected from the query optimizer tree, a next collected view to be handled is identified (e.g., at step 210). The next view node to be handled is processed is a similar manner as done for the first view node (e.g., at steps 212, 214, 216, and 218).

At 220 (e.g., as shown in FIG. 2B), if the current view node is the last view node to be handled of the view nodes collected from the query optimizer tree, the query optimizer tree is traversed to collect all view nodes that now have a result cache enabled.

At 222, a first view node with result cache enabled is identified as a current view node under processing.

At 224, result cache candidates are collected from a result cache.

At 226, a best matching result cache candidate is identified from among the collected result cache candidates.

At 228, the first view node is replaced in the query optimizer tree with the identified best matching result cache candidate.

At 230, a determination is made as to whether the current view node with result cached enabled is a last view node to be handled of the view nodes with result cache enabled that were collected from the query optimizer tree.

If the current view node is not the last view node to be handled of the view nodes with result cache enabled collected from the query optimizer tree, a next collected view with result cache enabled is identified, at step 222, as a next collected view node to handle (e.g., at step 210). The next view node to be handled is processed is a similar manner as done for the first view node (e.g., at steps 224, 226, 228, and 230).

At 232, if the current view node with result cache enabled is the last view node with result cache enabled to be handled of the view nodes collected from the query optimizer tree, query execution is continued which includes generation of a query execution plan (e.g., represented as a query execution tree).

At 234, query execution is started which includes reading data from a cached view to build a result cache.

At 236, the full data from the result cache is filtered to generate filtered result cache data by applying a predicate generated from dynamic conditions.

At 238, query execution is continued using the filtered result cache data to generate a result set.

At 240, the result set is returned to a provider of the query.

FIG. 3 illustrates example code 300 related to querying a view with a dynamic condition. Code statements 302 include SQL code for create a table T1 in a TEST_SCHEMA schema. A code statement 304 includes SQL code to create a view V1 that is based on the table T1. A code statement 306 includes SQL code to enable caching for the V1 view.

Code statements 308 include SQL code for defining a dynamic condition and configuring the dynamic condition for the V1 view using a P1 condition provider procedure. A code statement 310 includes an example user query that queries the V1 view. Using the improved caching approach described herein, the database system builds a result cache of the view V1 before a dynamic condition defined in the code statements 308 is applied. The dynamic condition can be applied, using the result cache, thus saving performance as compared to the database having to generate the V1 view.

Figure 4A:
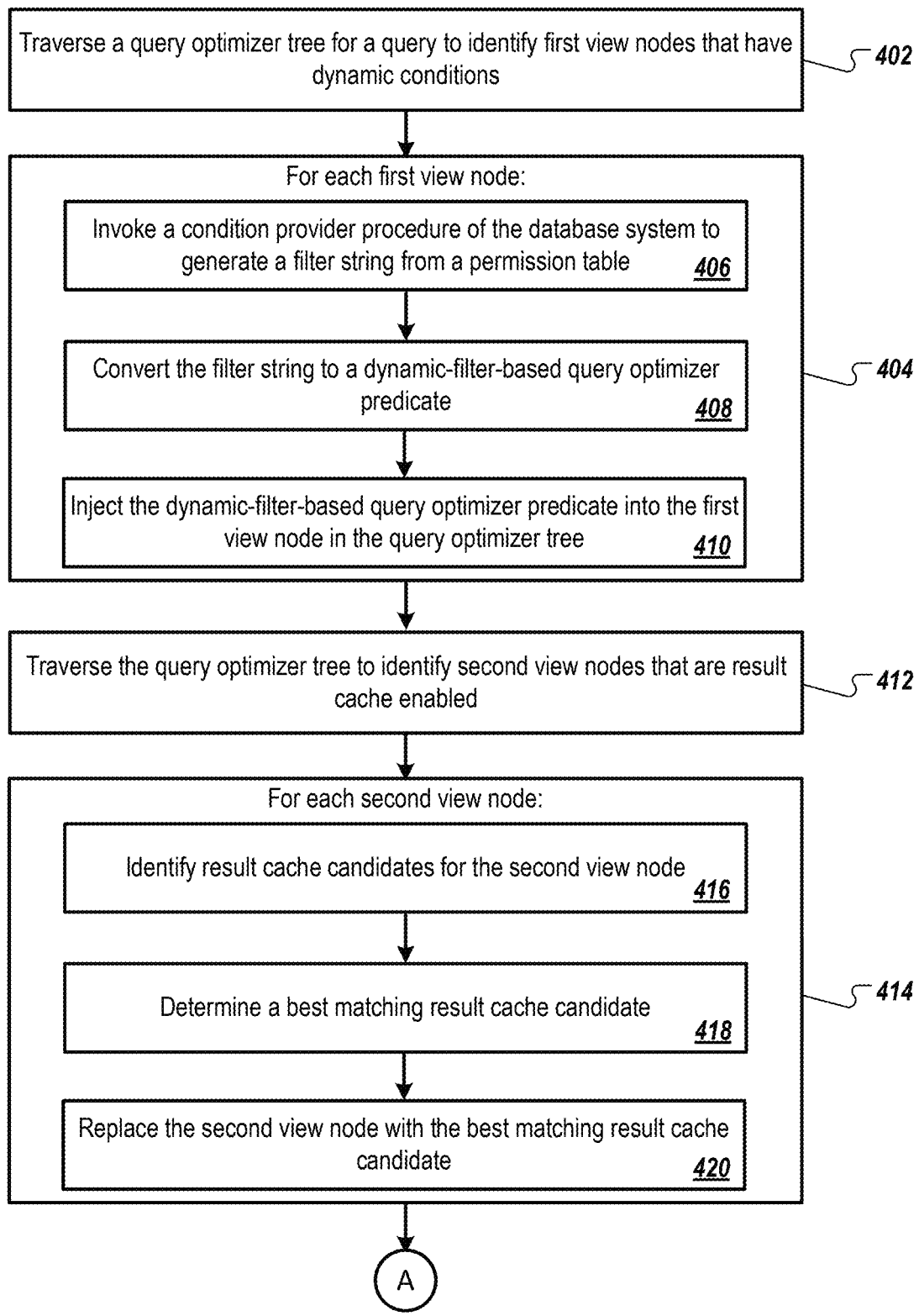
FIGS. 4A-4B are a flowchart of an example method for providing cached database views that include dynamic conditions.
Figure 4B:
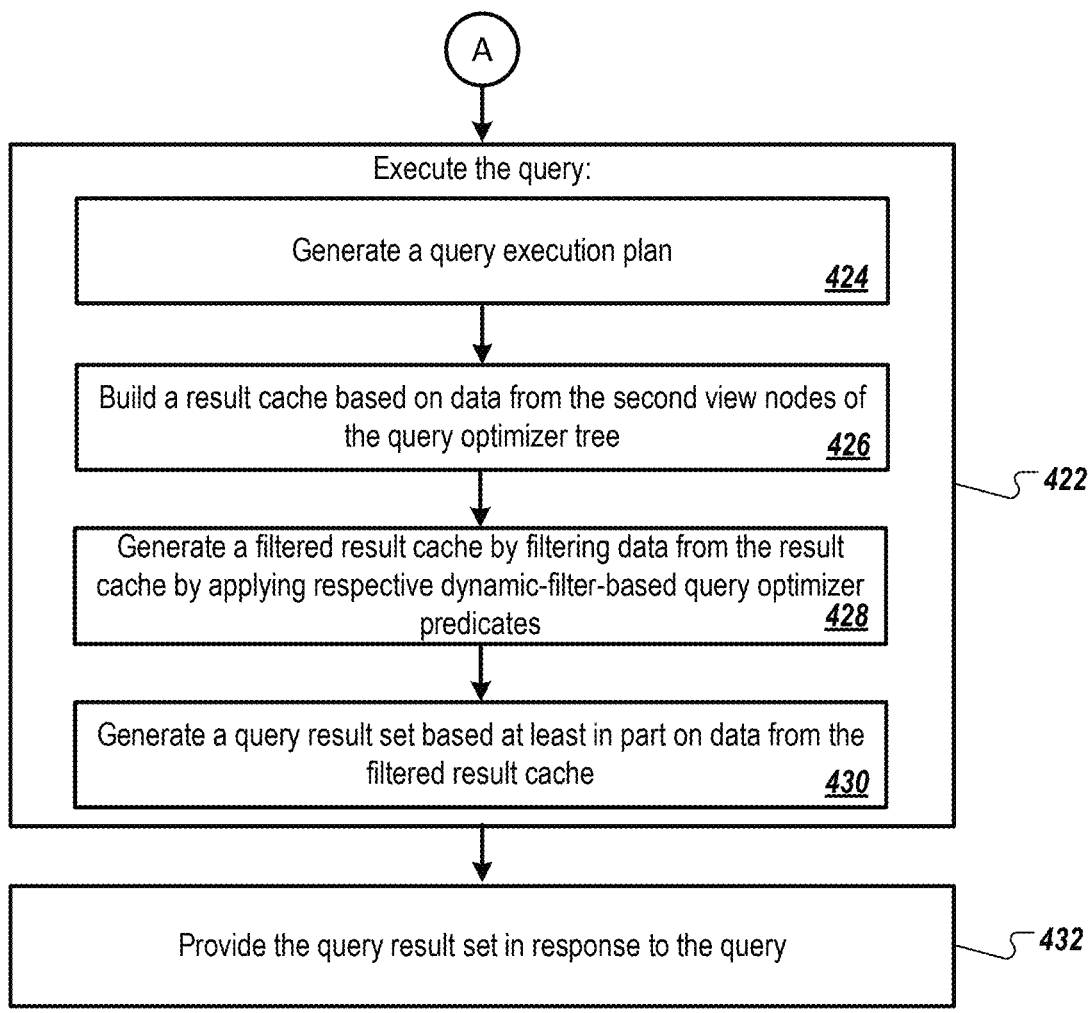

FIGS. 4A-4B are a flowchart of an example method for providing cached database views that include dynamic conditions. It will be understood that method 400 and related methods may be performed, for example, by any suitable system, environment, software, and hardware, or a combination of systems, environments, software, and hardware, as appropriate. For example, one or more of a client, a server, or other computing device can be used to execute method 400 and related methods and obtain any data from the memory of a client, the server, or the other computing device. In some implementations, the method 400 and related methods are executed by one or more components of the system 100 described above with respect to FIG. 1. For example, the method 400 and related methods can be executed by the dynamic condition engine 128 of FIG. 1.

At 402, a query optimizer tree is traversed for query received at a database system to identify first view nodes that have dynamic conditions. An initial configuration of the database system might not support cached views with dynamic conditions, for example. The query optimizer tree can be generated base on a query compiler tree. The query compiler tree can be generated based on a global query parse tree. The global query parse tree can be generated based on parsing the query received at the database system. The query can be an SQL query.

At 404, processing is performed for each first view node of the first view nodes.

At 406, for example, a condition provider procedure of the database system is invoked to generate a filter string from a permission table for a current user associated with the query.

At 408, the filter string is converted to a dynamic-filter-based query optimizer predicate.

At 410, the dynamic-filter-based query optimizer predicate is injected into the first view node in the query optimizer tree.

At 412, the query optimizer tree is traversed to identify second view nodes that are result cache enabled.

At 414, processing is performed for each second view node of the second view nodes.

At 416, for example, result cache candidates are identified for the second view node. For example, multiple result cache candidates for the second view node can be identified. The best matching result cache candidate for the second view node can be determined based on determining a best match of result cache candidates to the query received at the database system (e.g., based on a filter match, based on the received query and the best matching result set candidate not having a filter, etc.).

At 418, a best matching result cache candidate is determined from among the result cache candidates.

At 420, the second view node is replaced, in the query optimizer tree, with the best matching result cache candidate.

At 422, as shown in FIG. 4B, the query is executed.

At 424, executing the query includes generating a query execution plan.

At 426, a result cache is built based on data from the second view nodes of the query optimizer tree.

At 428, a filtered result cache is generated by filtering data from the result cache by applying respective dynamic-filter-based query optimizer predicates. Filtering the data from the result cache can include applying a first dynamic-filter-based query optimizer predicate for the current user to filter out data not appropriate for the current user.

At 430, a query result set is generated based at least in part on data from the filtered result cache.

At 432, the query result set is provided in response to the query. The query result set can be provided to the current user or to an application or process associated with the current user.

The preceding figures and accompanying description illustrate example processes and computer-implementable techniques. But system 100 (or its software or other components) contemplates using, implementing, or executing any suitable technique for performing these and other tasks. It will be understood that these processes are for illustration purposes only and that the described or similar techniques may be performed at any appropriate time, including concurrently, individually, or in combination. In addition, many of the operations in these processes may take place simultaneously, concurrently, and/or in different orders than as shown. Moreover, system 100 may use processes with additional operations, fewer operations, and/or different operations, so long as the methods remain appropriate.

In other words, although this disclosure has been described in terms of certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure.

What is claimed is:

1. A computer-implemented method comprising:
    traversing, for a query received at a database system, a query optimizer tree for the query to identify first view nodes that have dynamic conditions;
    for each first view node of the first view nodes:
        invoking a condition provider procedure of the database system to generate a filter string from a permission table for a current user associated with the query;
        converting the filter string to a dynamic-filter-based query optimizer predicate; and
        injecting the dynamic-filter-based query optimizer predicate into the first view node in the query optimizer tree;
    traversing the query optimizer tree to identify second view nodes that are result cache enabled;
    for each second view node of the second view nodes:
        identifying result cache candidates for the second view node;
        determining a best matching result cache candidate from among the result cache candidates; and
        replacing, in the query optimizer tree, the second view node with the best matching result cache candidate;
    executing the query, comprising:
        generating a query execution plan;
        building a result cache based on data from the second view nodes of the query optimizer tree;
        generating a filtered result cache by filtering data from the result cache by applying respective dynamic-filter-based query optimizer predicates; and
        generating a query result set based at least in part on data from the filtered result cache; and
    providing the query result set in response to the query.

2. The computer-implemented method of claim 1, wherein the query optimizer tree is generated base on a query compiler tree.

3. The computer-implemented method of claim 2, wherein the query compiler tree is generated based on a global query parse tree.

4. The computer-implemented method of claim 3, wherein the global query parse tree is generated based on parsing the query received at the database system.

5. The computer-implemented method of claim 1, wherein the query is a structured query language (SQL) query.

6. The computer-implemented method of claim 1, wherein filtering the data from the result cache comprises applying a first dynamic-filter-based query optimizer predicate for the current user to filter out data not appropriate for the current user.

7. The computer-implemented method of claim 1, wherein an initial configuration of the database system does not support cached views with dynamic conditions.

8. The computer-implemented method of claim 1, wherein multiple result cache candidates for at least one second view node are identified.

9. The computer-implemented method of claim 1, wherein the best matching result cache candidate for at least one second view node is determined based on determining a best match of result cache candidates to the query received at the database system.

10. A system comprising:
    one or more computers; and
    a computer-readable medium coupled to the one or more computers having instructions stored thereon which, when executed by the one or more computers, cause the one or more computers to perform operations comprising:
        traversing, for a query received at a database system, a query optimizer tree for the query to identify first view nodes that have dynamic conditions;
        for each first view node of the first view nodes:
            invoking a condition provider procedure of the database system to generate a filter string from a permission table for a current user associated with the query;
            converting the filter string to a dynamic-filter-based query optimizer predicate; and
            injecting the dynamic-filter-based query optimizer predicate into the first view node in the query optimizer tree;
        traversing the query optimizer tree to identify second view nodes that are result cache enabled;
        for each second view node of the second view nodes:
            identifying result cache candidates for the second view node;
            determining a best matching result cache candidate from among the result cache candidates; and
            replacing, in the query optimizer tree, the second view node with the best matching result cache candidate;
        executing the query, comprising:
            generating a query execution plan;

building a result cache based on data from the second view nodes of the query optimizer tree;

generating a filtered result cache by filtering data from the result cache by applying respective dynamic-filter-based query optimizer predicates; and generating a query result set based at least in part on data from the filtered result cache; and providing the query result set in response to the query.

11. The system of claim 10, wherein the query optimizer tree is generated base on a query compiler tree.

12. The system of claim 11, wherein the query compiler tree is generated based on a global query parse tree.

13. The system of claim 12, wherein the global query parse tree is generated based on parsing the query received at the database system.

14. The system of claim 10, wherein the query is a structured query language (SQL) query.

15. The system of claim 10, wherein filtering the data from the result cache comprises applying a first dynamic-filter-based query optimizer predicate for the current user to filter out data not appropriate for the current user.

16. A computer program product encoded on a non-transitory storage medium, the product comprising non-transitory, computer readable instructions for causing one or more processors to perform operations comprising:

traversing, for a query received at a database system, a query optimizer tree for the query to identify first view nodes that have dynamic conditions;

for each first view node of the first view nodes:
invoking a condition provider procedure of the database system to generate a filter string from a permission table for a current user associated with the query;
converting the filter string to a dynamic-filter-based query optimizer predicate; and
injecting the dynamic-filter-based query optimizer predicate into the first view node in the query optimizer tree;

traversing the query optimizer tree to identify second view nodes that are result cache enabled;

for each second view node of the second view nodes:
identifying result cache candidates for the second view node;
determining a best matching result cache candidate from among the result cache candidates; and
replacing, in the query optimizer tree, the second view node with the best matching result cache candidate;

executing the query, comprising:
generating a query execution plan;
building a result cache based on data from the second view nodes of the query optimizer tree;
generating a filtered result cache by filtering data from the result cache by applying respective dynamic-filter-based query optimizer predicates; and
generating a query result set based at least in part on data from the filtered result cache; and providing the query result set in response to the query.

17. The computer program product of claim 16, wherein the query optimizer tree is generated base on a query compiler tree.

18. The computer program product of claim 17, wherein the query compiler tree is generated based on a global query parse tree.

19. The computer program product of claim 18, wherein the global query parse tree is generated based on parsing the query received at the database system.

20. The computer program product of claim 16, wherein filtering the data from the result cache comprises applying a first dynamic-filter-based query optimizer predicate for the current user to filter out data not appropriate for the current user.

* * * * *